United States Patent [19]

Eisenstadt

[11] 4,254,154
[45] Mar. 3, 1981

[54] DIPEPTIDE SWEETENER COMPOSITIONS

[75] Inventor: Marvin E. Eisenstadt, Neponsit, N.Y.

[73] Assignee: Cumberland Packing Corp., Brooklyn, N.Y.

[21] Appl. No.: 956,041

[22] Filed: Oct. 30, 1978

[51] Int. Cl.$^3$ .............................................. A23L 1/236
[52] U.S. Cl. .................................... 426/548; 426/658; 426/804
[58] Field of Search ........................ 426/548, 658, 804

[56] References Cited

U.S. PATENT DOCUMENTS

| | | | |
|---|---|---|---|
| 3,625,711 | 12/1971 | Eisenstadt | 426/548 |
| 3,647,483 | 3/1972 | Eisenstadt | 426/548 |
| 3,875,311 | 4/1975 | Eisenstadt | 426/548 |
| 3,875,312 | 4/1975 | Eisenstadt | 426/548 |
| 3,956,507 | 5/1976 | Shoaf et al. | 426/548 X |
| 4,085,232 | 4/1978 | Eisenstadt | 426/548 |

FOREIGN PATENT DOCUMENTS 1009500  5/1977  Canada .................................... 426/548

*Primary Examiner*—Robert A. Yoncoskie
*Attorney, Agent, or Firm*—Steinberg & Raskin

[57] ABSTRACT

The artificial sweetener known as dipeptide sweetener, which is actually aspartyl phenylalanine methyl ester is mixed in specific proportions with a sugar such as dextrose, lactose, sucrose, etc. or a sugar alcohol such as xylitol, mannitol, etc. with a glycyrrhizin and with cream of tartar to provide a composition approaching the natural sweetness of ordinary sugar while using a minimum of the dipeptide sweetener.

6 Claims, No Drawings

DIPEPTIDE SWEETENER COMPOSITIONS

BACKGROUND OF THE INVENTION

An artificial sweetener known as dipeptide sweetener, which is actually aspartyl phenylalanine methyl ester has been developed in recent years, but has not yet come into actual commercial use. The dipeptide sweetener is about 150 times as sweet as sugar, which means that it is about one half as sweet as saccharine.

Compositions have been prepared, as in my U.S. Pat. No. 3,875,311 and U.S. Pat. No. 3,875,312 in which the dipeptide sweetener is mixed with various ingredients in order to try to approach a sweetness which is as close as possible to that of natural sugar. While the compositions of these patents does provide this effect, due to the fact that the dipeptide sweetener is only one half as sweet as saccharine, relatively large amounts of the dipeptide sweetener are required, which is particularly undesirable in view of the relatively high price of the dipeptide sweetener.

SUMMARY OF THE INVENTION

Generally speaking, in accordance with the present invention, a compostion is provided of dipeptide sweetener plus a sugar or sugar alcohol, a glycyrrhizin and cream of tartar.

It is an object of the present invention to provide a sweetening composition utilizing dipeptide sweetener as the artificial sweetening agent, in relatively small amounts, which composition does not have the flat sweetness taste or cloying sweetness of the dipeptide sweetener and in addition does not have the bitter aftertaste thereof.

It is yet a further object of the present invention to provide dipeptide sweetener compositions with a sweetening effect which is akin to that of natural sugar yet which, despite the fact that dipeptide sweetener is only one half as sweet as saccharine actually uses less dipeptide sweetener for the same sweetening effect than if saccharine were used.

Other objects and advantages of the present invention will be apparent from a further reading of the specification and of the appended claims.

The term "dipeptide sweetener" as used herein refers to the esters of aspartyl phenylalanine disclosed in U.S. Pat. No. 3,492,131 and U.S. Pat. No. 3,678,026, the most preferred of which is the methyl ester.

The term "cream of tartar" is used interchangeably herein with its chemical equivalent "potassium bitartrate".

The sugars and sugar alcohols which may be used in the composition of the present invention include sucrose, dextrose, fructose, lactose, etc. for the sugars and xylitol, mannitol, sorbitol, etc. for the sugar alcohols. These are all the commonly available and well known edible sugars and sugar alcohols.

The term "glycyrrhizin" as used herein refers to mono ammoniated glycyrrhizin, the dipotassium salt of glycyrrhizin, glycyrrhizic acid, spray dried licorice extract and other ammoniated glycyrrhizins. The term "glycyrrhizin" is used to include all of the above. The most preferred of the glycyrrhizins is mono ammoniated glycyrrhizin.

The glycyrrhizins are licorice root derivatives which are somewhat sweetener than sugar but which, because of their strong licorice taste, cannot be used in the same way as the natural sweeteners, even when mixed with the natural sweeteners.

It has been found according to the present invention that if the dipeptide sweetener is mixed with the glycyrrhizin as well as with a sugar or sugar alcohol and cream of tartar, in specific proportions which are indicated below, relatively small amounts of dipeptide sweetener can be used and the resulting product has a sweetness which is very close to that of natural sugar.

This result is achieved apparently due to a synergistic sweetening effect of the overall composition.

The extent of the synergistic effect is apparent from the following analysis:

Saccharine is about 300 times as sweet as sugar. Approximately 40 milligrams of saccharine are required to achieve a sweetness equal to approximately two teaspoons of sugar.

Dipeptide sweetener is about 150 times as sweet as sugar. In ordinary compositions using dipeptide as the artificial sweetener, approximately 80 milligrams of the dipeptide sweetener are required to achieve the sweetness equal to about two teaspoons of natural sugar. However, in the composition of the present invention the sweetness equal to two teaspoons of natural sugar can be achieved with from 5-40 milligrams of dipeptide sweetener.

In order to achieve this synergistic sweetening effect of the dipeptide sweetener, while also obtaining a natural sweetness, the components of the composition of the invention should be used in the following proportions:

(a) Dipeptide-sweetener-0.5-4% by weight, preferably about 1% by weight.

(b) Glycyrrhizin-1 to 6% by weight, preferably 3% by weight.

(c) Sugar or sugar alcohol-87 to 98% by weight, preferably 94-95% by weight.

(d) Cream of tartar-0.5 to 3% by weight, preferably 1-2% by weight.

DESCRIPTION OF PREFERRED EMBODIMENTS

The following examples are given to further illustrate the present invention. The scope of the invention is not, however, meant to be limited to the specific details of the examples.

EXAMPLE 1

94.5 kilograms of dextrose, 3 kilograms of mono ammoniated glycyrrhizin, 1.5 kilograms of cream of tartar, and 1 kilogram of dipeptide sweetener (aspartyl phenylalanine methyl ester) are thoroughly mixed to provide a uniform mixture.

The resulting mixture is approximately 10 times as sweet as sugar and 1 gram of this mixture has the sweetening effect of about 2 teaspoons of sugar. The mixture can be used to sweeten beverages or in cooking, in all quantities, even to highly sweeten beverages, without causing any bitter aftertaste, any licorice aftertaste and without adversely affecting the taste of the food or beverage to which it is applied.

EXAMPLE 2

A sweetening composition is prepared as in Example 1, however using 87 kilograms of dextrose, 6 kilograms of mono ammoniated glycyrrhizin, 3 kilograms of cream of tartar and 4 kilograms of dipeptide sweetener.

EXAMPLE 3

A sweetening composition is prepared as in Example 1, however using 98 kilograms of dextrose, 1 kilogram of mono ammoniated glycyrrhizin, 0.5 kilograms of cream of tartar and 0.5 kilograms of dipeptide sweetener.

Any of the above Examples may be repeated, substituting lactose, sucrose, or fructose for the dextrose with the same effect being obtained. Moreover, the sugar alcohols may be used in place of the dextrose with the same effect obtained.

The above Examples can also be repeated substituting any of the other glycyrrhizins for the mono ammoniated glycyrrhizin. The effect is the same.

While the invention has been illustrated in particular with respect to specific amounts of the specific ingredients, it is apparent that variations and modifications of the invention can be made.

What is claimed is:

1. A sweetening composition, consisting essentially of (a) a dipeptide sweetener in an amount of about 0.5-4% by weight, (b) a glycyrrhizin in an amount of 1-6% by weight, (c) a natural sugar or sugar alcohol in an amount of 87-98% by weight, and (d) cream of tartar in an amount of 0.5-3% by weight.

2. Composition according to claim 1 wherein said dipeptide sweetener is aspartyl phenylalanine methyl ester.

3. Composition according to claim 1 wherein said sugar is selected from the group consisting of dextrose, lactose, fructose and sucrose.

4. Composition according to claim 1 wherein said glycyrrhizin is mono ammoniated glycyrrhizin.

5. Composition according to claim 1 wherein said dipeptide sweetener is apartyl phenylalanine methyl ester, said glycyrrhizin is mono ammoniated glycyrrhizin and said sugar is dextrose or lactose.

6. Composition according to claim 1 wherein said dipeptide sweetener is present in an amount of about 1% by weight, said glycyrrhizin is present in an amount of about 3% by weight, said sugar or sugar alcohol is present in an amount of about 94-95% by weight, and said cream of tartar is present in an amount of about 1-2% by weight.

* * * * *